June 15, 1948.      A. E. HANSEN ET AL      2,443,242
ADJUSTABLE BRACKET
Filed April 16, 1946

INVENTORS
ARIEL E. HANSEN
AND
CHARLES F. HANSEN

BY

ATTORNEY

Patented June 15, 1948

2,443,242

UNITED STATES PATENT OFFICE 2,443,242

ADJUSTABLE BRACKET

Ariel E. Hansen and Charles F. Hansen,
Long Beach, Calif.

Application April 16, 1946, Serial No. 662,495

2 Claims. (Cl. 248—279)

This invention relates to an adjustable bracket.

One object of the invention is to provide an extension arm bracket adapted for mounting on a wall or window frame having adjustable means for holding the arm at a selected angle. Another object is to provide an extension arm bracket which may be rotated on a vertical axis. These and other objects are attained by our invention which will be understood from the following description and the accompanying drawing in which.

Figure 1:
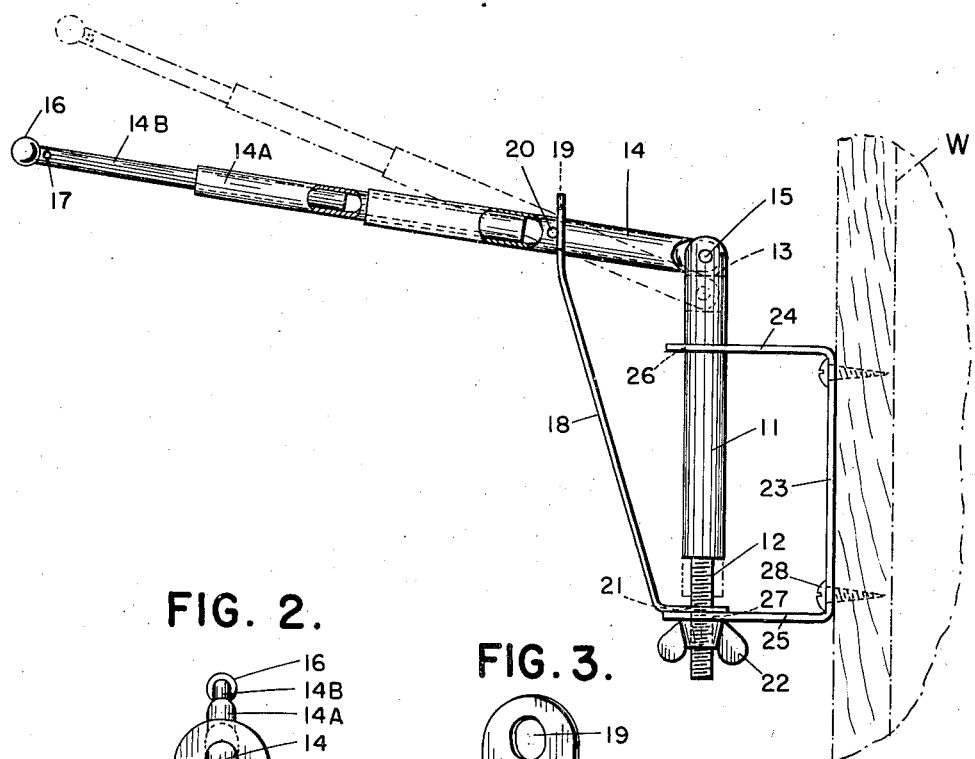
Fig. 1 is a side elevational view showing a preferred arrangement of our bracket.
Figure 2:
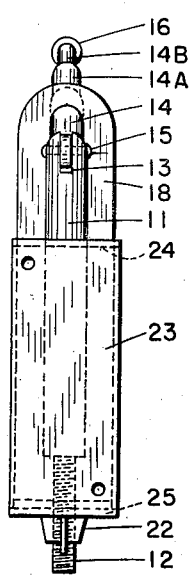
Fig. 2 is an end elevational view.
Figure 3:
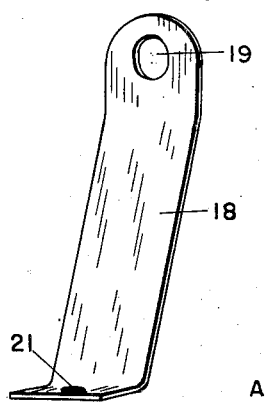
Fig. 3 is a perspective view showing the angle brace.

Referring to the drawings, our bracket consists of a vertical rod 11 which is provided with screw threads on its lower end 12 and is provided with a slot 13 on its upper end in which is pivoted the end of a support arm 14 on the pivot pin 15. As shown, the support arm consists of three telescoping tubes, the outer or free end of the inner tube 14B being conveniently provided with a terminal ball 16 and with a hole 17 near the end of the arm, the ball or the hole being for use in attaching other articles to the support arm. An angle brace member 18 is provided to adjustably position the support arm 14 in angular relation to the vertical rod 11. A hole 19 in one end of the angle brace 18 slides on the portion of the support arm 14 adjacent the pivoted end. A pin 20 is provided in the support arm 14 against which the brace may abut. The other end of the angle brace 18 is bent at right angles to the end having the hole 19, and it is also provided with a hole 21 which slides over the threads in the threaded portion 12 of the vertical rod 11, being held in position thereon by the wing nut 22. The vertical rod 11 is attached to and held in position on the wall or window frame or other vertical surface W by means of a hanger 23 having an upper horizontal arm 24 and lower horizontal arm 25, wood screws 28 being used to hold the hanger 23 to the wall W. The upper arm 24 is provided with a hole 26 having a slip fit around the vertical rod 11 and the lower arm 25 is provided with a hole 27 which slips over the threads on the screw-threaded portion 12 of rod 11. By adjusting the position of the wing nut 22 on the threaded portion 12 of the rod 11, the angular relation between the vertical rod and the support arm 14 may be adjusted to any desired angle. The angle brace 18 not only positions the support arm but also gives it strength and rigidity. The support arm may be extended to the desired length by means of the telescoping tubes 14A and 14B. The support arm, angle brace and vertical rod may be rotated as a unit in the holes 26 and 27 of the hanger. Our bracket device may be used for supporting curtains and drapes, for which purpose the ball 16 prevents the drapes from sliding off the end. This arrangement has the advantage that the drapes may be rotated from a position over or partly over a window to a position at the side of the window frame. The bracket device may also conveniently be used for supporting a back view mirror or other object where it is desired to have the position adjustable at both vertical and horizontal angles.

While we have shown a telescoping or extendable support arm, it will be clear that this arrangement may be varied to include a single rod, or other arrangements for extending the support arm to varying lengths. Other variations in the details of the construction may be made within the scope of the appended claims.

We claim:

1. An adjustable bracket comprising a vertical rod having its upper end arranged with a bending joint connection to a support arm, a support arm disposed generally in a horizontal position and having one end flexibly connected to the upper end of said vertical rod, an angle brace rod slidingly fitted on said support arm in the portion adjacent the connection and having its lower end movably attached on said vertical rod, abutting means on said support arm to hold said angle brace in position on the arm, hanger means for said vertical rod adapted to permit axial rotation thereof, and vertical adjustable threaded nut means operative on the threaded lower end of said vertical rod for adjustably positioning and holding thereon the lower end of said angle brace.

2. An adjustable bracket comprising a vertical rod having its lower end screw-threaded and its upper end arranged with a bending joint connection to a support arm, a support arm disposed generally in a horizontal position and having one end flexibly connected to the upper end of said vertical rod, an angle brace rod slidingly fitted on said support arm in the portion adjacent the connection and having its other end slidingly engaged attached on the threaded end of said rod, abutting means on said support arm to hold said angle brace in position on the arm, hanger means including upper and lower hanger arms, said upper hanger arm having an opening slidingly engaging said vertical rod in its upper portion and said lower hanger arm slidingly engaging the threaded lower end of said vertical rod, and threaded nut means on the screw threads of said vertical rod for holding thereon said lower hanger arm and said angle brace.

ARIEL E. HANSEN.
      CHARLES F. HANSEN.

REFERENCES CITED

The following references are of record in the file of this patent:

UNITED STATES PATENTS

| Number | Name | Date |
|---|---|---|
| 834,202 | Hawthorne et al. | Oct. 23, 1906 |
| 1,386,151 | Brewer | Aug. 2, 1921 |